United States Patent [19]
Perry

[11] 3,821,790
[45] June 28, 1974

[54] AUTOMATIC TINT CIRCUIT FOR FLESH TONE CORRECTION

[75] Inventor: Clifton C. Perry, Fort Wayne, Ind.
[73] Assignee: The Magnavox Company, Ft. Wayne, Ind.

[22] Filed: Aug. 18, 1972
[21] Appl. No.: 281,899

[52] U.S. Cl. .......... 358/28
[51] Int. Cl. .......... H04n 9/12
[58] Field of Search .. 178/5.4 HE, 5.4 MC, 5.4 AC, 178/5.2 A

[56] References Cited

UNITED STATES PATENTS

| | | | |
|---|---|---|---|
| 3,654,384 | 4/1972 | Kresock | 178/5.4 HE |
| 3,662,097 | 5/1972 | Rennick | 178/5.4 HE |
| 3,701,844 | 10/1972 | Cochran | 178/5.4 HE |

OTHER PUBLICATIONS

Schematic Diagram for Magnovox T920 color TV chassis.

*Primary Examiner*—Robert L. Richardson
*Attorney, Agent, or Firm*—T. A. Briody; W. W. Holloway; R. T. Seeger

[57] ABSTRACT

A circuit for providing natural looking flesh color in a color television receiver is disclosed having at least two primary color amplifiers therein comprising a viewer actuable switch, first means responsive to actuation of the switch to change the gain of at least one of the amplifiers, and second means responsive to the actuation of the switch to change the input-output phase shift of at least one and generally both of the amplifiers. The switch is effective in one position to bypass an impedance which is common to both amplifier circuits and thus render them independent while in another position it functions to insert this common impedance making the amplifier circuits' phase shift behavior interdependent. In this other position the switch also functions to add additional resistance in parallel with an existing transistor emitter circuit resistor to thereby change the relative gains of the amplifier stages.

11 Claims, 3 Drawing Figures

AUTOMATIC TINT CIRCUIT FOR FLESH TONE CORRECTION

BACKGROUND OF THE INVENTION

This invention relates to color correction circuitry for color television receivers and more particularly to such color correction circuitry for causing flesh tone colors to appear more realistic to the viewer. Such flesh tone correcting circuits are known in the art, and may, for example, be of the type disclosed as a preferred embodiment in copending application Ser. No. 168,018 filed Aug. 4, 1971 and now U.S. Pat. No. 3,700,043 in the name of John L. Slusarski entitled "Method and Apparatus for Modifying Electrical Signals" and assigned to the assignee of the present invention. As is well-known, the phase of the modulated color subcarrier represents its hue, and the amplitude of that modulated color subcarrier is representative of the saturation, and there is a direct analogy between the vectors of the color subcarrier and colors displayed as represented by a so-called color circle or color wheel. In the preferred embodiment disclosed in the aforementioned application correction of flesh tone colors is accomplished by deriving a pair of correction vectors from the demodulated primary color signals after appropriately clipping those signals and adding the pair of correction vectors to all color vectors in the half plane which includes the flesh tone vector as a line perpendicular to the line defining that half plane. This process tends to shift all color vectors in that half plane toward the flesh tone vector with the shifting effect being more pronounced for vectors close to the flesh tone vector.

It is also known in the prior art, for example, on page 413 of the book entitled *Principles of Color Television* edited by the Hazeltine Laboratories Staff and published by John Wiley & Sons in 1956 to employ a common cathode matrix amplifier for decoding I and Q signals into their corresponding red, blue and green color difference signals. Such a common cathode matrix amplifier employs an impedance which is common to two amplifying tubes thus making their outputs interdependent and effecting the phase shift required for decoding.

It is a primary object of the present invention to employ the phase shift capabilities of mutual impedance amplifier stages as disclosed for decoders in the aforementioned textbook in color difference amplifiers to thereby provide a flesh tone correcting effect.

SUMMARY OF THE INVENTION

The foregoing as well as numerous other objects and advantages of the present invention are achieved by providing a selectively removable mutual impedance in at least two color difference amplifier circuits to thereby effect a change in the inherent phase shifts of those amplifiers and a corresponding change in the color wheel vectors to be displayed on the television screen. Such an approach, of course, represents a substantial saving in parts cost and production expenses over color correcting circuits such as represented by the aforementioned application.

Accordingly, it is another object of the present invention to provide a more economical automatic tint control circuit.

A general object of the present invention is to provide a circuit for improving flesh tone reproduction capabilities of a television receiver.

A further object of the present invention is to provide an automatic tint control circuit which is less complex than existing automatic tint control circuits.

A still further object of the present invention is to provide an automatic tint control circuit which is easily adaptable to existing television receiver circuits.

BRIEF DESCRIPTION OF THE DRAWING

The aforementioned and other objects, features and advantages of the present invention will become more apparent from the following detailed description thereof when considered in conjunction with the drawings wherein.

DESCRIPTION OF THE PREFERRED EMBODIMENT

Figure 1:
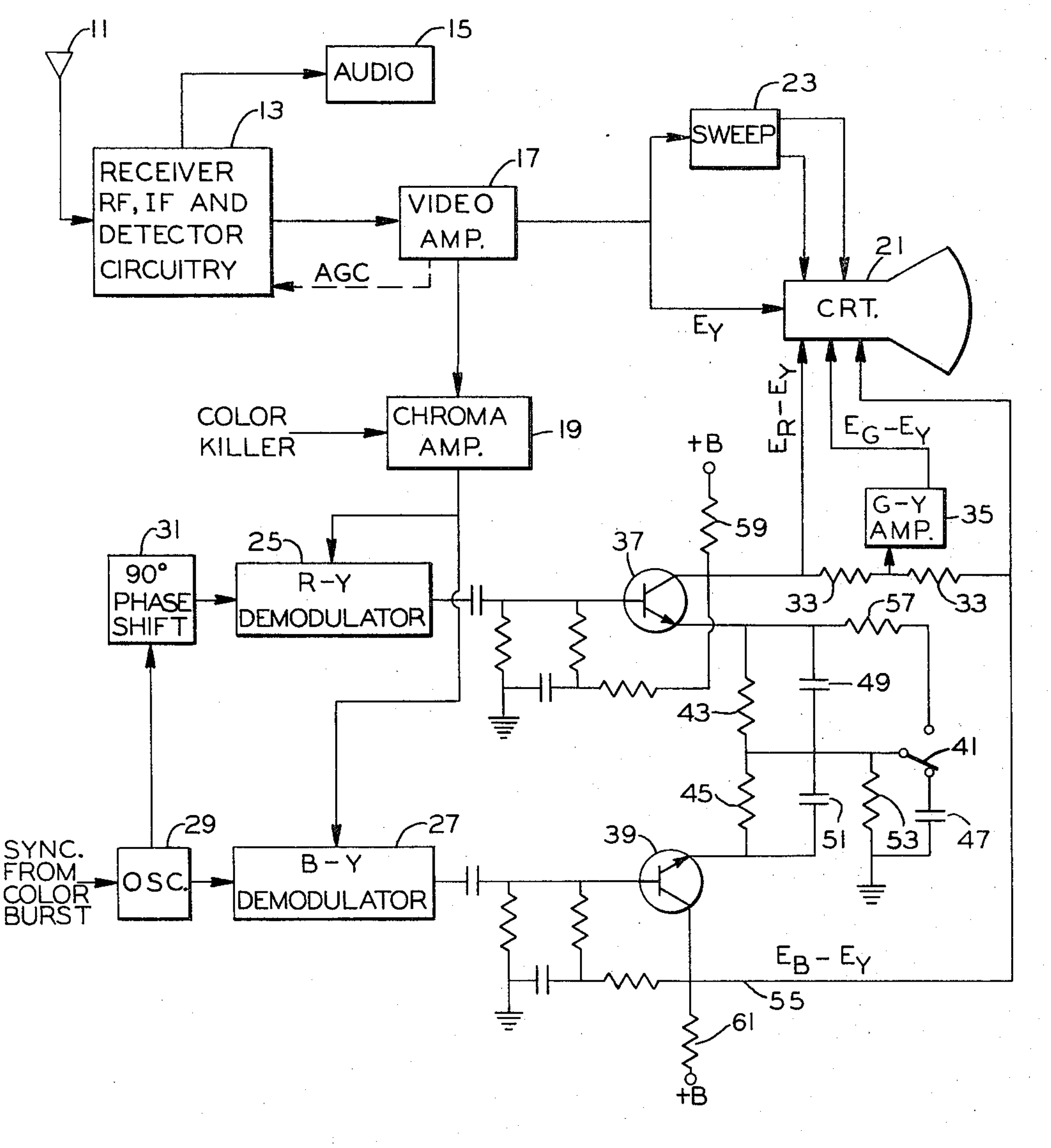
FIG. 1 is a generalized block diagram of a color television receiver with the important elements of a preferred embodiment of the present invention shown in detailed schematic form.

Considering first FIG. 1 which illustrates typical elements of a color television receiver in a generalized block diagram form, signals are received by an antenna 11 and supplied to typical receiver radio frequency and intermediate frequency amplifiers and detector circuitry which supplies audio signals to the audio output system 15 and video signals to the video amplifier 17. The video amplifier 17 may return automatic gain control signals to this receiver section, and, of course, other control signals such as automatic fine tuning control may also be returned to the receiver circuitry 13. The video amplifier 17 provides a chrominance signal to the chroma amplifier 19 as well as a luminance (Y) signal to the cathode-ray tube 21. The various synchronizing signals associated with a normal television receiver are, of course, also employed to control the horizontal and vertical sweep function illustrated generally by the sweep block 23. The chroma amplifier 19 has a typical color killer input which may be derived in any well-known prior art manner to prevent signals from passing through the chrominance system during black and white reception. The output of the chroma amplifier 19 is supplied to R − Y and B − Y demodulators 25 and 27 which, in conjunction with signals from a local oscillator 29 which is synchronized by the incoming color burst and a phase shifting or delay circuit 31, function to convert the carrier encoded I and Q signals to color difference signals for the red and blue colors respectively. A green difference signal may be obtained from the red and blue color difference signals by the resistive divider network 33 which implements the equation $E_G - E_Y = -0.51 (E_R - E_Y) - 0.19 (E_B - E_Y)$, and this green color difference signal supplied to the appropriate grid in the cathode-ray tube 21 by way of a green color difference amplifier 35. As thus far described the circuit of FIG. 1 is typical of most any color television receiver, and such a typical color television receiver would supply the outputs of the demodulators 25 and 27 by way of similar amplifying stages to appropriate grids in the cathode-ray tube 21. The red and blue color difference amplifier stages illustrated in FIG. 1 are not, however, typical amplifier stages.

The heart of the red and blue color difference amplifier circuits is respectively transistor 37 and transistor 39, each of which is illustrated as an NPN transistor connected in a common emitter configuration. With the switch 41 in the position shown, the midpoint of the voltage divider circuit 43–45 is grounded in so far as alternating current signals are concerned by way of the capacitor 47. The resistors 43 and 45 are equal as are the capacitors 49 and 51, and while the switch 41 is in the position shown the two amplifier circuits function independent of one another despite the fact that they have a common connection at the junction of resistors 43 and 45. With the switch 41 in the position shown the operation of the amplifier stages for the red and blue color difference signals are identical, and only one will be briefly explained.

The input circuit to the blue color difference amplifier allows an input signal in the base emitter circuit of transistor 39 to cause a corresponding amplified current to flow in the collector emitter circuit of that transistor thus providing an output circuit signal on line 55 to be supplied to the cathode-ray tube. Bias is supplied in known fashion by way of resistor 61 and the amplifier stage 39 introduces a 180° phase shift between its input and output signals. It should also be noted that the impedance which comprises the parallel combination of resistor 45 and capacitor 51 is common to both the input circuit and the output circuit for this transistor amplification stage and that this common impedance is effectively connected to a point of reference potential such as ground by way of the capacitor 47 which effectively bypasses the impedance 53 when the single-pole double-throw switch 41 is in the position illustrated. The switch 41 is positioned on the television receiver so as to be viewer actuable, and when the viewer is dissatisfied with displayed flesh tone renditions he may actuate the switch 41 so as to connect the midpoint of the voltage divider 43–45 to one end of the resistor 57 rather than to the capacitor 47. This accomplishes the insertion of an additional impedance in the form of resistor 53 between the common connection between resistors 43 and 45 and a point of reference potential such as ground and also connects the resistance 57 in parallel with resistor 43. Lowering the effective emitter resistance of transistor 37 increases the gain of that stage. While the gains of the two transistor stages were equal with switch 41 in its down position moving it to its up position has effectively changed the relative gain of these stages and has introduced the impedance 53 as being not only common to the input and output circuits of amplifier stage 39, but also this same impedance is common to the input and output circuits of the amplifier stage 37. The presence of this common impedance serves to vary the phase shift of the respective amplifiers from their normal 180°.

Since the resistance between the junction of resistors 43 and 45 and the emitter of transistor 37 is decreased by moving the switch to its up position while the corresponding resistance to the emitter of transistor 39 remains unchanged the gain of the blue color difference amplifier stage may be made to drop relative to the gain of the red color difference amplifier stage when the switch is moved to its upward position. The presence of the impedance 53 which is common to both amplifier stages also introduces a change in the phase shifts of those amplifier stages which is most easily recognized by assuming that the potential at the base of transistor 37 increases thus causing increased conduction in the collector emitter circuit of that transistor and a correspondingly greater voltage drop across the resistor 53, which increased voltage drop raises the potential at the emitter of transistor 39 diminishing its base to emitter current and therefore diminishing the current flow through the collector emitter circuit of transistor 39 and raising the potential on the line 55. Since an increase in the voltage on line 55 results from an increase in the potential at the base of transistor 37 which corresponds to a decrease in the $E_R - E_Y$ signal due to the 180° phase shift of transistor 37, the contribution to $E_B - E_Y$ due to an R − Y channel signal is 180° out of phase with the $E_R - E_Y$ output signal from the transistor 37. This is graphically illustrated in FIG. 2.

Figure 2:
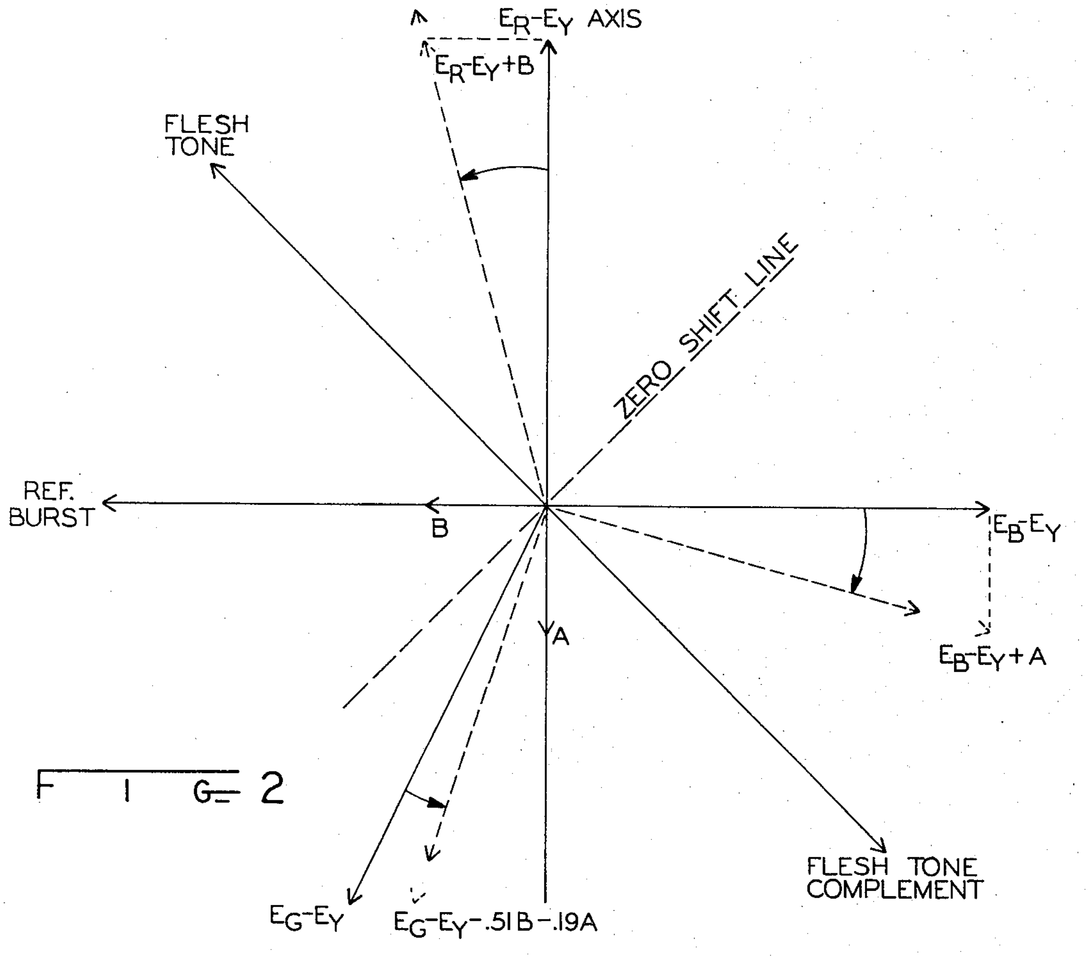
FIG. 2 is a vector diagram illustrating the effect of the flesh tone correcting circuit of FIG. 1.

FIG. 2 is a vector (phasor) diagram illustrating the phase relationship between the color difference signals which, as noted earlier, is directly analogous to the corresponding colors as represented by a so-called color circle or color wheel. In FIG. 2 the $E_R - E_Y$ and $E_B - E_Y$ signals supplied to the cathode-ray tube are illustrated by vectors along the Y and X axis respectively. A color vector representing flesh tone lies in the fourth quadrant leading the $E_R - E_Y$ vector by 45°, and the derived $E_G - E_Y$ vector lies in the third quadrant lagging the $E_B - E_Y$ vector by 123°. These vectors, as illustrated in solid lines, show the normal phase relationship for a typical color television receiver without tint correction such as the receiver of FIG. 1 when the switch 41 is in the position shown. Moving the switch 41 to its up position introduces a fraction of the negative of $E_R - E_Y$ which is illustrated as vector A into the signal on line 55 thus effectively shifting the $E_B - E_Y$ output clockwise to the position illustrated as a dotted vector. Further, as previously noted, the gain of the stage 39 may be somewhat diminished so that the resultant signal on line 55 is illustrated as the foreshortened vector in the second quadrant. Similarly, a fraction of the negative of $E_B - E_Y$ which is illustrated as vector B is introduced into the $E_R - E_Y$ output line thus effectively shifting the $E_R - E_Y$ vector counterclockwise to the position illustrated as a dotted vector, however, the gain of the $E_R - E_Y$ amplifier stage has been increased thus yielding the vector illustrated which is of a greater magnitude than the original $E_R - E_Y$ vector. Quantitatively, a 100 ohm value for resistor 53 has been found to shift each amplifier output about 15°. This same sort of shifting effect will be experienced by any other color vector in the plane since any other vector may be represented as a linear combination of $E_R - E_Y$ and $E_B - E_Y$. Vectors lying along the line which bisects the first quadrant of the diagram will experience no shifting by the circuitry of the present invention, and this line has been labeled "zero shift line" and serves to divide the plane of the diagram into two half planes wherein any color vector which is in the half plane including the flesh tone vector will be shifted toward that flesh tone vector whereas any color vector lying in the half plane containing the flesh tone complement (a blue) will be shifted toward that flesh tone complement. In other words, the circuit of the present invention functions to emphasize flesh tones and simultaneously functions to emphasize the complement of those flesh tones, however, it has been found that the average viewer is particularly sensitive to errors in flesh tone colors, whereas he fails to even recognize the shifting of colors such as blue toward the complement of flesh tone.

Figure 3:
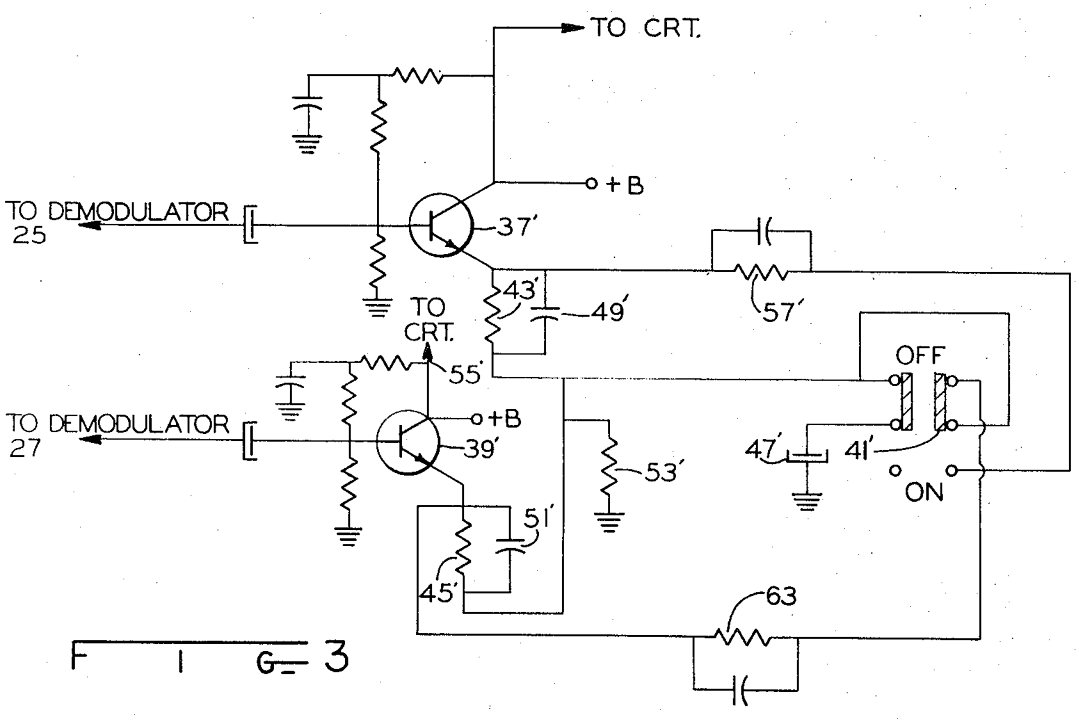
FIG. 3 is a schematic diagram of an alternate form of the red and blue color difference amplifiers of FIG. 1.

Considering now FIG. 3 which represents in schematic form an alternate to the automatic tint control circuit illustrated in FIG. 1 and which may be substituted therefor in the block diagram of FIG. 1 like or similar elements have corresponding primed reference numerals. The primary difference between the circuit of FIG. 3 and that found in FIG. 1 is that the switch 41' is now a double pole double throw switch, the left half of which effectively bypasses the common impedance 53' when the switch is in its off or up position. The right half of the double pole double throw switch 41 functions in its up or off position to connect an additional resistor 63 in the emitter circuit of transistor 39' whereas when the right half of the switch 41' is in its on or down position it functions to insert the additional resistance 57' in the emitter circuit of transistor 37'. As noted earlier, the insertion of this additional resistance in parallel with the existing emitter resistances is effective to increase the gain of that transistor stage whereas the removal of this parallel resistance diminishes the gain of that transistor stage. Resistance values in the circuit of FIG. 3 are so selected that with the switch in its off position the gain of the two stages is the same and thus by moving the switch to its on position the gain of stage 39' is decreased due to the removal of resistor 63 whereas the gain of stage 37' is increased due to the insertion of resistor 57'. The circuit of FIG. 3 functions basically the same as the circuit illustrated in FIG. 1 except the switch 41' is now effective to change the gain of both transistor stages.

Thus while the present invention has been described with respect to a specific embodiment and a modification thereon, numerous modifications will suggest themselves to those of ordinary skill in the art. Thus, for example, the present invention is applicable to any color television receiver employing color difference amplifiers. The G − Y signal could be derived either before or after the selective phase shift introduced by the circuitry of the present invention. The circuit need not be limited to emphasizing flesh tones, but rather could easily be employed to emphasize any pair of complementary colors. These as well as other modifications will readily suggest themselves to one of ordinary skill in the art, and accordingly the scope of the present invention is to be measured only by that of the appended claims.

What is claimed is:

1. In a color television receiver having at least two amplifiers for at least two primary color signals, the two amplifiers having a common connection, a circuit for improving the flesh tone reproduction capability of the television receiver comprising: an impedance coupling said common connection to a point of reference potential; and means for selectively bypassing said impedance comprising the series combination of a switch and a capacitor in parallel with the impedance whereby when the switch is closed the impedance is effectively bypassed for alternating current signals.

2. The improvement of claim 1 wherein the impedance comprises a resistor coupled between said common connection and ground.

3. The improvement of claim 1 wherein the means for selectively bypassing comprises a single-pole, double-throw switch effective in one position to bypass the impedance and effective in the other position to modify the gain of at least one of the amplifiers.

4. The improvement of claim 3 wherein the impedance comprises a resistor coupled between said common connection and ground and the means for bypassing further comprises a capacitor connected in parallel with the resistor when said switch is in said one position thereby bypassing the common impedance for alternating current signals and allowing the amplifiers to function independent of one another despite their common connection.

5. In a color television receiver a flesh tone correcting circuit comprising a first color difference signal amplifier having an input circuit and an output circuit, a second color difference signal amplifier having an input circuit and an output circuit, an impedance common to at least one of the input and output circuits of said first amplifier and to at least one of the input and output circuits of said second amplifier, and means for selectively varying said common impedance to thereby selectively vary the input-output phase shift of at least one of the amplifiers.

6. The combination of claim 5 wherein the means for selectively varying comprises the series combination of a switch and a capacitor connected in parallel with the impedance.

7. The combination of claim 5 wherein the means for selectively varying comprises a single-pole double-throw switch effective in one position to bypass the impedance and effective in the other position to modify the gain of at least one of the amplifiers.

8. The combination of claim 5 wherein the first and second amplifiers comprise first and second transistors having their emitters resistively coupled together with the midpoint of that resistive coupling further selectively coupled to ground by said common impedance.

9. The combination of claim 5 wherein the means for selectively varying comprises a viewer actuable switch effective in one position to allow the two amplifiers to function independent of one another despite their common connection.

10. In a color television receiver a flesh tone correcting circuit comprising a first color signal amplifier having an input circuit and an output circuit, a second color signal amplifier having an input circuit and an output circuit, an impedance common to at least one of the input and output circuits of said first amplifier and to at least one of the input and output circuits of said second amplifier, and means for selectively varying said common impedance to thereby selectively vary the input-output phase shift of at least one of the amplifiers.

11. The combination of claim 10 wherein the means for selectively varying comprises a viewer actuable switch effective in one position to allow the two amplifiers to function independently of one another despite their common connection.

* * * * *